United States Patent
Jaegle et al.

(10) Patent No.: US 8,844,282 B2
(45) Date of Patent: Sep. 30, 2014

(54) EXHAUST-GAS TURBOCHARGER HAVING A BALL-COCK WASTE-GATE VALVE WITH A STRESS-RELIEVED CRANK ARM

(75) Inventors: Alexander Jaegle, Mannheim (DE); Roland Herfurth, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/122,767

(22) PCT Filed: May 9, 2012

(86) PCT No.: PCT/EP2012/058506
§ 371 (c)(1),
(2), (4) Date: Nov. 27, 2013

(87) PCT Pub. No.: WO2012/163638
PCT Pub. Date: Dec. 6, 2012

(65) Prior Publication Data
US 2014/0075933 A1    Mar. 20, 2014

(30) Foreign Application Priority Data
May 27, 2011  (DE) .......................... 10 2011 076 587

(51) Int. Cl.
F02D 23/00  (2006.01)
F16K 1/20  (2006.01)
F02B 37/12  (2006.01)
F02B 37/18  (2006.01)

(52) U.S. Cl.
CPC ............ *F02B 37/12* (2013.01); *F05B 2220/40* (2013.01); *F16K 1/20* (2013.01); *Y02T 10/144* (2013.01); *F02B 37/186* (2013.01)
USPC ................ 60/602; 60/605.2; 60/624

(58) Field of Classification Search
USPC ......................... 60/602, 605.2, 624
See application file for complete search history.

(56) References Cited

U.S. PATENT DOCUMENTS

| | | | |
|---|---|---|---|
| 4,256,285 A | 3/1981 | Davidson | |
| 8,572,961 B2 * | 11/2013 | Karnik et al. | ........ 60/602 |
| 2011/0000209 A1 | 1/2011 | Boening et al. | |

FOREIGN PATENT DOCUMENTS

| | | |
|---|---|---|
| DE | 2828223 A1 | 1/1979 |
| DE | 3336879 A1 | 4/1985 |
| DE | 102004030624 A1 | 2/2006 |
| DE | 102008011416 A1 | 9/2009 |
| DE | 202010005747 U1 | 7/2010 |
| DE | 202010005774 U1 | 8/2010 |

* cited by examiner

*Primary Examiner* — Ching Chang
(74) *Attorney, Agent, or Firm* — Laurence A. Greenberg; Werner H. Stemer; Ralph E. Locher

(57) ABSTRACT

An exhaust-gas turbocharger has a turbine housing and a waste-gate valve of a ball-cock configuration which is arranged therein. The actuating crank of the waste-gate valve has a crank arm, to which the closing element is fastened, and a crank spindle which is connected integrally to the crank arm and is mounted in the turbine-housing wall. A stop shoulder for sealing the crank-spindle bearing and a flexural-stress relief pocket are provided in the transition region between the crank spindle and the crank arm, as a result of which the sealing action of the crank-spindle bearing and a more uniform distribution of flexural stresses in the transition region between the crank arm and the crank spindle are brought about and therefore an increased service life of the actuating crank is ensured with a simultaneously economical configuration.

5 Claims, 4 Drawing Sheets

EXHAUST-GAS TURBOCHARGER HAVING A BALL-COCK WASTE-GATE VALVE WITH A STRESS-RELIEVED CRANK ARM

BACKGROUND OF THE INVENTION

Field of the Invention

The invention relates to an exhaust-gas turbocharger, the turbine of which has a wastegate duct that can be closed off by means of a ballcock-type valve.

Exhaust-gas turbochargers are increasingly used for increasing power in motor vehicle internal combustion engines. This is ever more commonly done with the aim of reducing the structural size and weight of the internal combustion engine while maintaining the same power output or even increasing the power output, and simultaneously reducing consumption and thus $CO_2$ emissions, in this respect in view of ever more stringent legal regulations. The operating principle consists in utilizing the energy contained in the exhaust-gas flow to increase the pressure in the intake tract of the internal combustion engine, and thus realize improved charging of the combustion chamber with atmospheric oxygen and thus be able to convert more fuel, gasoline or diesel, per combustion process, that is to say increase the power of the internal combustion engine.

To this end, an exhaust-gas turbocharger has a turbine, which is arranged in the exhaust tract of the internal combustion engine and which has a turbine rotor driven by the exhaust-gas flow, and a compressor, which is arranged in the intake tract and which has a compressor rotor that builds up the pressure. The turbine rotor and compressor rotor are fastened rotationally conjointly to opposite ends of a rotor shaft which is rotatably mounted in a bearing unit arranged between the turbine and compressor. Thus, by means of the exhaust-gas mass flow, the turbine wheel and, via the rotor shaft, in turn the compressor wheel are driven and the exhaust-gas energy is thus utilized for building up pressure in the intake tract.

Turbines and compressors are turbomachines and, based on the laws of physics, have an optimum operating range which is dependent in each case on structural size and type of construction, said operating range being characterized by the mass throughput, the pressure ratio and the rotational speed of the respective rotor. By contrast, the operation of an internal combustion engine in a motor vehicle is characterized by dynamic changes in load and operating range.

In order to now be able to adapt the operating range of the exhaust-gas turbocharger to changing operating ranges of the internal combustion engine, and thus ensure a desired response behavior as far as possible without perceptible delays (turbo lag), exhaust-gas turbochargers are equipped with so-called variable turbine geometries and with bypass ducts that can be opened by means of valve flaps. A corresponding bypass duct on the turbine side is referred to as a wastegate. The wastegate connects the exhaust-gas duct upstream of the turbine rotor as viewed in the flow direction to the exhaust-gas duct downstream of the turbine rotor. The wastegate can be opened and closed by means of a closing device, for example a valve flap. In the case of a low rotational speed and the correspondingly low exhaust-gas mass flow rate of the internal combustion engine, the wastegate is closed, and the entire exhaust-gas mass flow is conducted via the turbine rotor. This ensures an adequate rotational speed of the turbine and compressor rotor, and thus an adequate pressure build-up by the compressor even at low rotational speeds of the internal combustion engine. In the case of a high rotational speed and a correspondingly high exhaust-gas mass flow rate of the internal combustion engine, the wastegate is then opened, and at least a part of the exhaust-gas mass flow is conducted past the turbine rotor directly into the exhaust pipe region downstream of the turbine rotor as viewed in the flow direction, in order to keep the rotational speed of the turbine and compressor rotor, and the pressure ratio across the turbine and compressor, within the desired operating range of the exhaust-gas turbocharger.

As a closing device for opening and closing the wastegate duct, use is made, in a known manner, of flap valves. A conventional flap valve of said type is illustrated in FIG. 1 in a sectional illustration of a turbine housing 10. The exhaust-gas mass flow AM enters into the spiral housing 2 of the exhaust-gas turbine via the inlet region 1. From the spiral housing 2, the exhaust-gas mass flow AM is conducted to the turbine wheel (not illustrated) and then emerges through the outletregion 4 into the exhaust system, and through the latter into the environment. The wastegate duct 3 now connects the inlet region 1 to the outlet region 4 directly. The wastegate duct 3 has a planar valve seat 8. To close the wastegate duct, a closing element 5, in this case in the form of a plate-shaped valve flap, is set down onto the valve seat 8. The closing element 5 is fastened to a crank arm 6 which is mounted so as to be rotatable about the crank spindle axis of rotation 7. By rotation of the crank arm 6 about the crank spindle axis of rotation 7, the closing element 5 is set down onto the valve seat 8 from an approximately vertical direction along the closing-opening path 9 of the valve flap, the wastegate duct 3 thus being closed and, in the reverse direction, opened.

A further embodiment of a wastegate valve is disclosed in DE102008011416A1, and is illustrated in section in FIGS. 2 and 3. Here, too, the exhaust-gas mass flow AM enters the spiral housing 2 of the exhaust-gas turbine via the inlet region 1. From the spiral housing 2, the exhaust-gas mass flow AM is conducted to the turbine wheel (not illustrated) and then passes out through the outlet region 4 into the exhaust system, and through the latter into the environment. The wastegate duct 3 now connects the inlet region 1 to the outlet region 4 directly. The valve is a so-called ballcock-type valve. Here, the closing element 5 is in the form of a spherical segment, which in turn is connected to a crank arm 6 of the actuating crank 14. The crank arm 6 is mounted in the turbine housing wall 16, by means of the crank spindle 12 and a spindle bearing bushing 13, so as to be rotatable about the crank spindle axis of rotation 7. Here, however, the arrangement of the crank arm 6 and of the closing element 5 on the crank arm 6 is selected such that, when the crank arm rotates about the axis 7, the closing element pivots into the wastegate duct 3 along a closing/opening path 11 approximately parallel to the valve seat 8, and is finally seated sealingly on the valve seat 8. This has the advantage that the exhaust-gas force which acts on the closing element and counter to the closing force acts on the crank arm 6 with a smaller lever effect. Thus, the required actuation forces that an actuator must exert on the control lever 13, which is connected rotationally conjointly to the crank spindle 12 on the outside of the turbine housing, in order to close the valve, and hold the valve closed, with the greatest possible sealing action are significantly lower than in the case of the conventional variant mentioned above.

The disadvantage of said embodiment is however that significantly greater normal forces act on the crank arm and, via the rotary spindle, on the spindle bearing bushing, and increased flexural stresses act in the crank arm 6 and in particular at the transition from the crank arm 6 to the rotary spindle 12. Said effect is further intensified by a sharp-edged shoulder 17 at the transition region between the crank spindle 12 and crank arm 6, said shoulder simultaneously being required as an abutment stop and for sealing the leadthrough of the crank spindle through the turbine housing wall 16, in the manner of a labyrinth seal.

This requires a geometrically or materially fortified configuration of the crank arm and rotary spindle in order to ensure the required durability during operation. This in turn has an adverse effect on the weight, the sealing action of the spindle bearing and the dimensions of the exhaust-gas turbocharger and on the costs of the valve mechanism.

BRIEF SUMMARY OF THE INVENTION

The present invention is therefore based on the object of specifying an exhaust-gas turbocharger with a wastegate valve, in which the actuation forces for the actuation of the valve are low, but structural size, weight, function and costs of the exhaust-gas turbocharger are not adversely affected, or are at least adversely affected to the least possible extent, as a result.

Said object is achieved by means of an exhaust-gas turbocharger having the features of the claims. The dependent claims relate to advantageous embodiments and refinements, which may be used individually or in combination with one another. The exhaust-gas turbocharger has an exhaust-gas turbine with a turbine housing. In the turbine housing, which is enclosed by a turbine housing wall, there is arranged a wastegate valve. The wastegate valve is in the form of a ballcock-type valve and has a spherical-segment-shaped closing element and an actuating crank. The actuating crank has a crank arm, to the front end of which the closing element is fastened. Connected integrally to the crank arm, and thus forming a unit, is a crank spindle. The crank arm with the closing element is arranged in the interior of the turbine housing. By way of the crank spindle, the actuating crank extends through the turbine housing wall to the outside and is mounted in the turbine housing wall so as to be rotatable about a crank spindle axis of rotation. In the transition region between crank spindle and crank arm, there is provided an abutment shoulder by means of which the actuating arm bears against a counterpart stop of the turbine housing wall or of a spindle bearing bushing. In this way, the axial position of the actuating arm relative to the turbine housing wall is defined, and at the same time the bearing gap of the crank spindle bearing is closed in the manner of a simple labyrinth seal so as to prevent an outflow of exhaust gas, so-called "blow-by". The invention is characterized in that, adjoining the abutment shoulder on the crank arm inner side directed toward the turbine housing wall, there is provided a flexural-stress relief pocket which effects a more uniform distribution of flexural stresses in the transition region between crank arm and crank spindle.

The following advantages are obtained by means of the invention.

Firstly, the use of a ballcock-type valve makes it possible, owing to the lever ratios provided, to realize a good sealing action of the wastegate valve with a relatively low actuation force. Furthermore, the flexural-stress relief pocket ensures a more harmonious distribution of the stress lines in the actuating crank, in particular in the region of the transition between crank arm and crank spindle and in the region of the abutment shoulder. In this way, the flexural stress peaks such as have hitherto been generated in the region of the abutment shoulder by the increased normal forces on the actuating crank are effectively eliminated, and a geometrically or materially fortified design of the actuating crank is not required. At the same time, it is possible for the abutment shoulder to be maintained in the known form, which is of great significance for the sealing of the crank spindle bearing.

Advantageous embodiments of the invention are disclosed in the subclaims.

One advantageous embodiment of the invention is configured such that the flexural-stress relief pocket extends in the crank arm in the radial direction toward the crank spindle axis of rotation as far as into the region of the crank spindle outer diameter, so as to undercut the abutment shoulder, and has a rounded contour at its pocket base formed there. It is ensured in this way that the flexural stress lines in the crank arm run along the flexural-stress relief pocket around the rounded contour of the pocket base, and thus run past the abutment shoulder into the crank spindle with a wide arc. The feared stress peaks at the sharp-edged (90° angle) abutment shoulder thus do not occur, and premature failure of the component owing to the notch effect that arises at said location can be prevented.

It has proven to be particularly advantageous if the rounded contour on the pocket base of the flexural-stress relief pocket has a radius of between 0.2 mm and 1.5 mm. In this way, it is ensured firstly that the material thickness of the crank arm is not excessively diminished, and secondly that an adequately large rounding is provided at the pocket base in order to avoid critical stress peaks.

A further embodiment of the invention is characterized in that the flexural-stress relief pocket extends along the crank arm inner side, that is to say on the inner side of the knee angle spanned by the crank spindle and crank arm, on that side of the crank arm which faces toward the turbine housing wall, and is delimited on both sides by in each case one reinforcement rib. Here, the profile of the reinforcement ribs and the profile of the flexural-stress relief pocket follow the profile of the crank arm. This configuration of the flexural-stress relief pocket gives rise to a crank arm geometry that is expedient from a production aspect, and simultaneously ensures a high level of stiffness against flexing of the crank arm under the action of the exhaust-gas forces during operation, despite the material thickness of the crank arm being diminished owing to the flexural-stress relief pocket.

It is furthermore advantageous if the height of the reinforcement ribs on the crank arm inner side is selected such that said reinforcement ribs, proceeding from the crank arm inner side, extend in the direction of the crank spindle axis of rotation at most as far as into the region of the abutment shoulder. In this way, the maximum stiffness of the crank arm against flexing of the crank arm under the action of the exhaust-gas forces during operation is ensured, and at the same time, said shaping makes it possible to realize a considerable material saving on the crank arm, which in turn results in a lower weight and lower costs.

Summarized in other words, the essence of the invention concerns an exhaust-gas turbocharger having a turbine housing and having a wastegate valve of ballcock-type design arranged therein. The actuating crank of the wastegate valve has a crank arm to which the closing element is fastened, and a crank spindle which is integrally connected to the crank arm and which is mounted in the turbine housing wall. An abutment shoulder for sealing off the crank spindle bearing, and a flexural-stress relief pocket, are provided in the transition region between crank spindle and crank arm, whereby the sealing-off of the crank spindle bearing and a more uniform distribution of flexural stresses in the transition region between crank arm and crank spindle are realized, and thus a lengthened service life of the actuating crank, and at the same time an economical design, are ensured Exemplary embodiments of the invention will be explained in more detail below on the basis of the illustrations in the drawing, in which:

DESCRIPTION OF THE INVENTION

Parts of identical function and nomenclature are denoted by the same reference signs throughout the figures.

Figure 1:
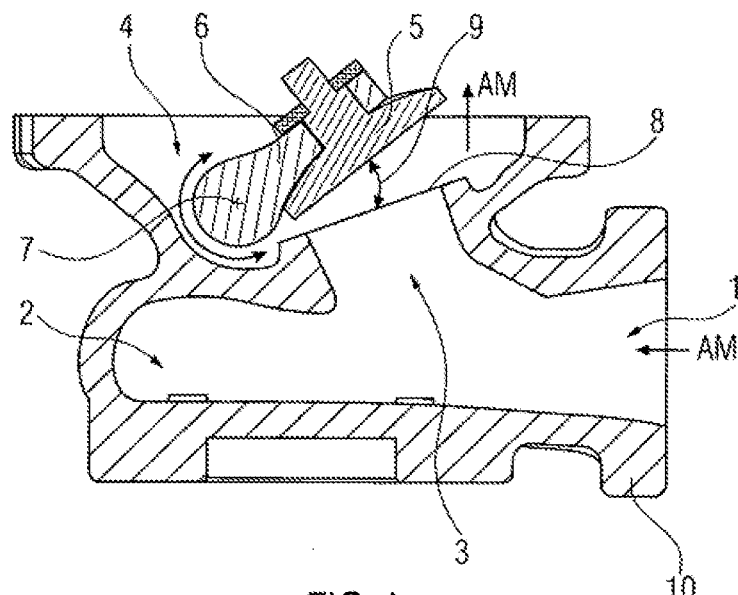
FIG. 1 is a sectional illustration of a turbine housing in a side view, with a flap valve according to the prior art.
Figure 2:
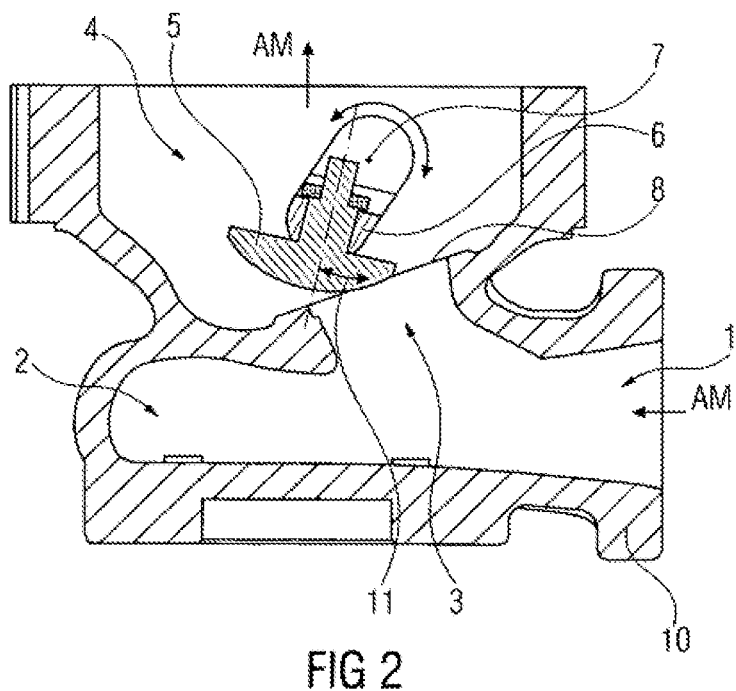
FIG. 2 is a sectional illustration of a turbine housing in a side view, with a ballcock-type valve according to prior art.
Figure 3:
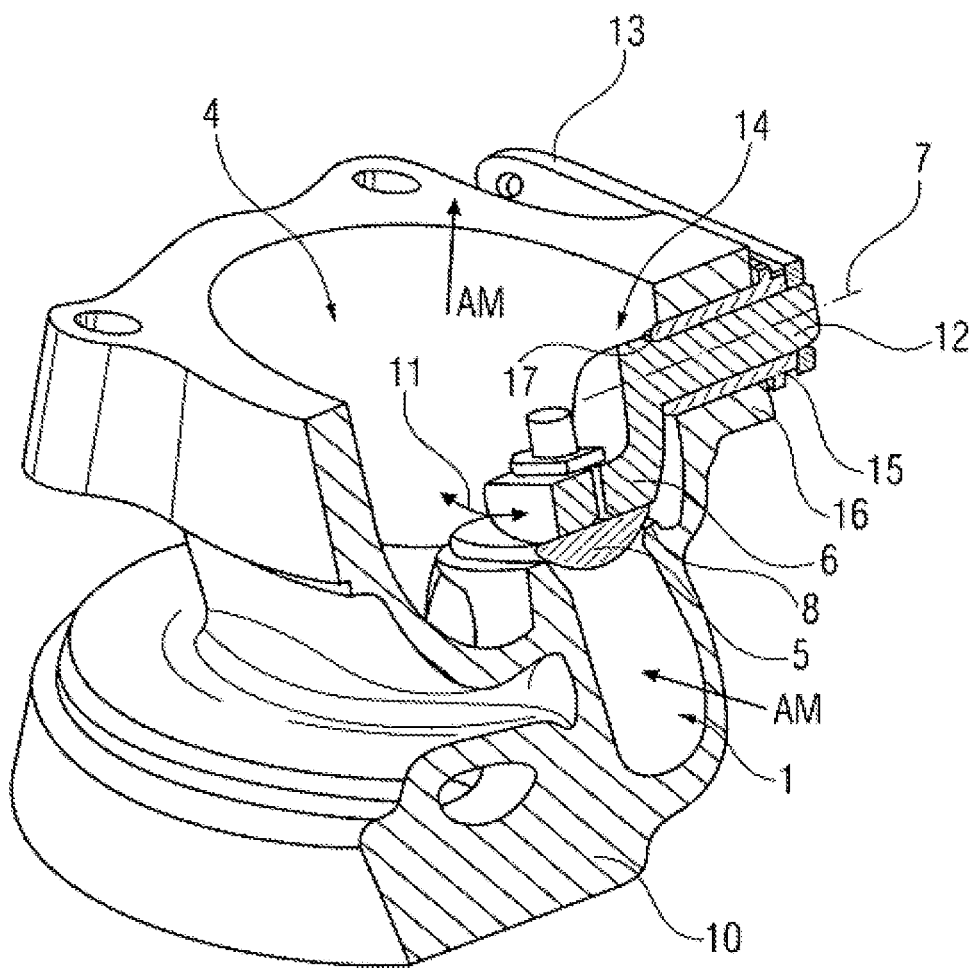
FIG. 3 is a sectional illustration of the turbine housing from FIG. 2, in a perspective view.

The subjects of FIGS. 1, 2 and 3 show the already-known prior art and have already been correspondingly referred to in the introductory part of the description.

Figure 4:
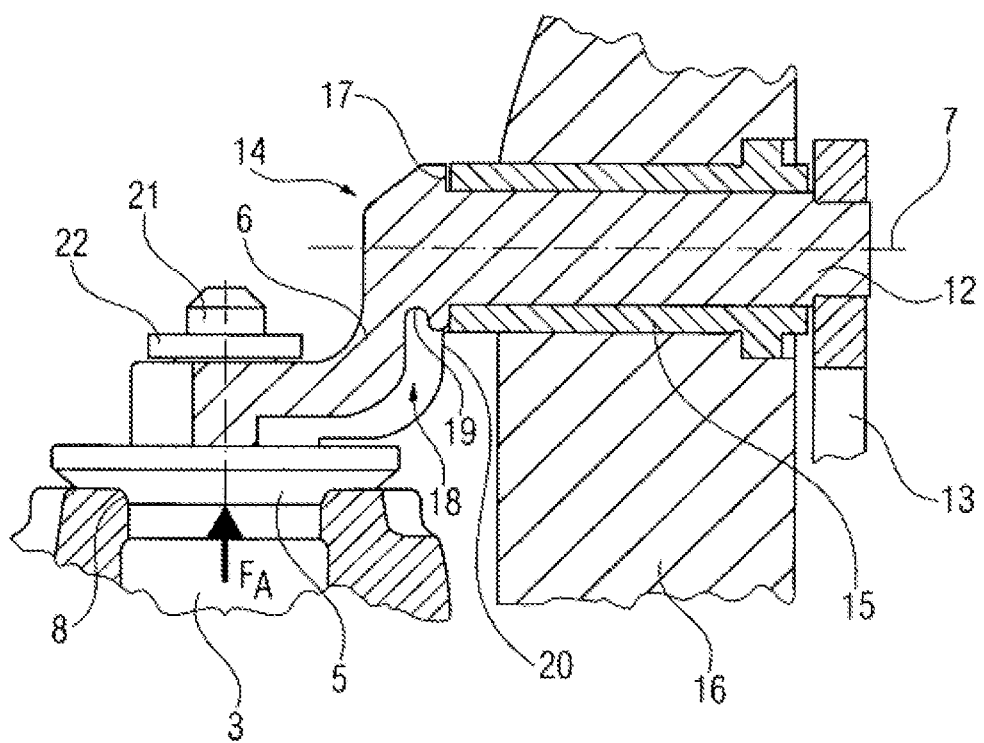
FIG. 4 is a sectional illustration of the wastegate arrangement of an exhaust-gas turbocharger according to the invention.

FIG. 4 shows a ballcock-type wastegate valve in an embodiment such as is used in the exhaust-gas turbocharger according to the invention. The closing element 5 is fastened to the crank arm 6 of the actuating crank 14. The closing element 5 has a section of a spherical segment which sets down on the valve seat 8 and thereby sealingly closes the wastegate duct 3. For the fastening of the closing element 5 to the crank arm, the closing element 5 has a fastening peg 21 which extends through a corresponding through-bore on the end of the crank arm 6 and is secured in said position by means of a lock washer 22. The crank spindle 12 of the actuating arm 14 extends through the turbine housing wall 16 and is mounted therein, so as to be rotatable about the crank spindle axis of rotation 7, by means of the spindle bearing bushing 15. On the outer side of the turbine housing, a control lever 13 is connected rotationally conjointly to the crank spindle of the actuating crank 14. By means of an actuator (not illustrated), there is exerted on the control lever 13 an actuation force which acts as a torque on the crank spindle 12 and sets the actuating crank 14 in rotation about the crank spindle axis of rotation 7. Depending on the direction of action of the actuating force, the closing element 5 is pivoted toward or away from the valve seat 8, and the wastegate valve is thus closed and opened. The crank arm 6 is formed in one piece together with the crank spindle 12 as a unit, and forms an angle of 90° with the crank spindle. In the further profile away from the crank spindle 12, the crank arm runs in a 90° arc and finally runs parallel to the crank spindle axis of rotation 7. The receiving bore for the fastening peg 21 of the closing element 5 is in turn arranged at a 90° angle on the end of the crank arm, such that the central axis of the closing element 5 is in turn arranged at a 90° angle with respect to the crank spindle axis of rotation 7. The direction of action of the exhaust-gas force $F_A$ is indicated in FIG. 4 by the arrow denoted $F_A$.

In the transition region between the crank spindle 12 and crank arm 6, there is formed on the actuating crank 14 an abutment shoulder 17 by means of which the actuating crank bears against the face side of the spindle bearing bushing 15 and thus predefines the axial position of the actuating crank. Furthermore, the abutment shoulder 17 thereby covers the bearing gap between crank spindle 12 and spindle bearing bushing 15 and thus serves as a simple labyrinth seal for sealing off the bearing gap. In this way, the discharge of exhaust gas via the bearing gap (blow-by) is prevented. As viewed from the direction of the crank spindle 12, the flexural-stress relief pocket 18 is arranged behind the abutment shoulder 17 in the crank arm.

Figure 5:
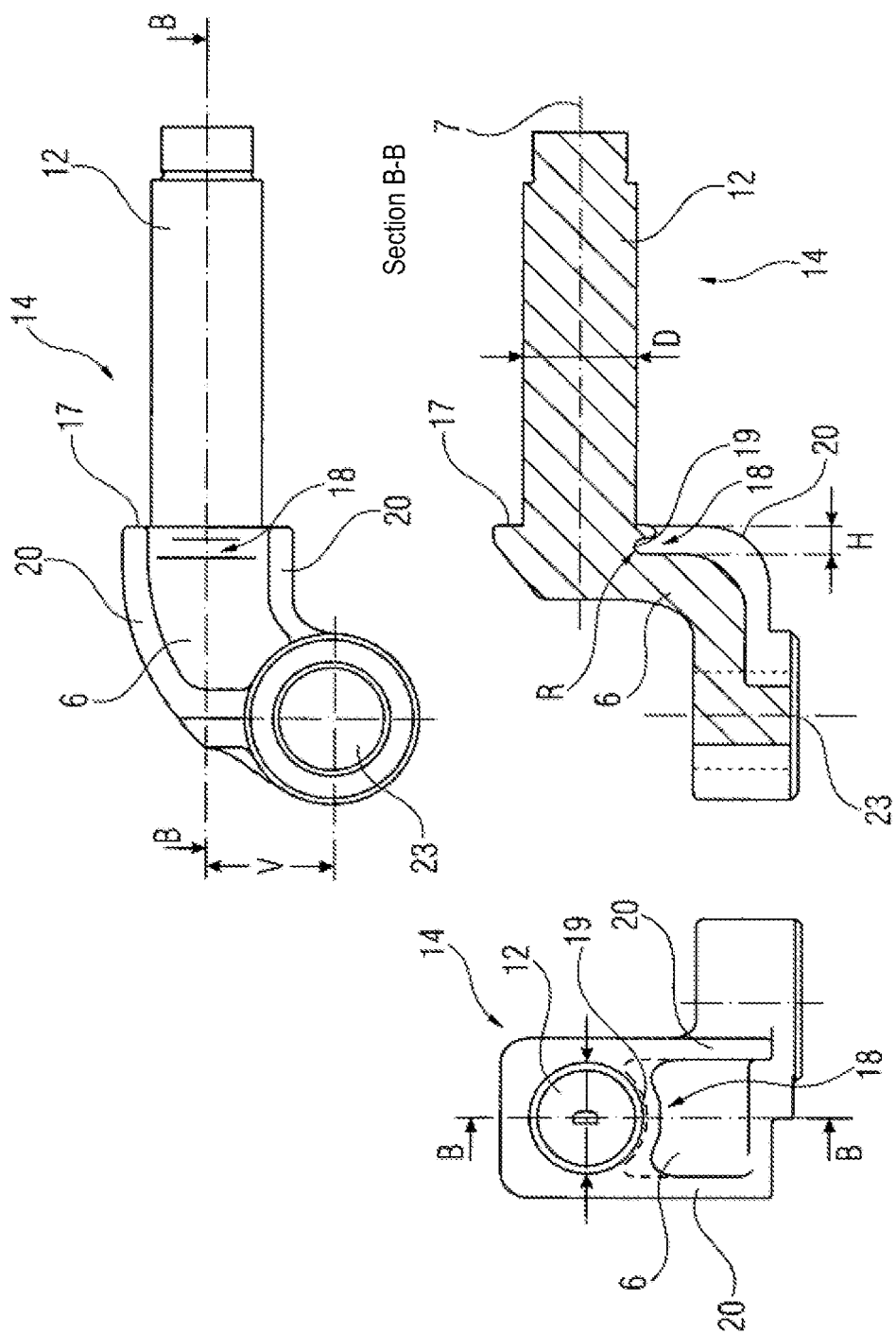
FIG. 5 is an illustration of an actuating crank of a wastegate valve of an exhaust-gas turbocharger according to the invention, in three views.

As can be seen particularly clearly from FIG. 5, which illustrates the actuating crank 14 on its own in three different views, the flexural-stress relief pocket 18 extends in the crank arm 6 radially in the direction of the crank spindle axis of rotation 7 as far as into the region of the crank spindle outer diameter D, so as to undercut the abutment shoulder, and forms a rounded contour with a radius R at its pocket base 19 formed there. By means of said indentation, the material thickness of the crank arm 6 is diminished. To compensate for said diminishment, the crank arm 6 is provided, on its lateral edges, with reinforcement ribs 20 which laterally delimit the flexural-stress relief pocket 18 and which contribute significantly to the stiffening of the crank arm 6. From the sectional illustration B-B in the side view of the actuating crank 14 at the bottom right of FIG. 5, it can be seen that the height H of the reinforcement ribs 20 is selected such that said reinforcement ribs extend in the direction of the crank spindle axis of rotation 7 as far as the abutment shoulder 17 and thus, in one plane, merge into the abutment shoulder 17.

Overall, the actuating crank 14 has a relatively complex geometry. The crank arm 6 initially forms a 90° angle with the crank spindle 12 for describing a further 90° bend in its further extent, such that the crank arm 6, after said bend, runs parallel to the crank spindle axis of rotation 7. The receiving bore 23 for receiving the fastening peg 21 of the closing element 5 by means of a lock washer 22 (see FIG. 4) is arranged on that end of the crank arm 6 which faces away from the crank spindle 12. The receiving bore 23 is in this case arranged on the end of the crank arm 6 with an offset V with respect to the crank spindle axis of rotation. In this way, in the closed state of the wastegate valve, the exhaust-gas force FA (see FIG. 4) not only imparts a flexural force that acts on the actuating crank 14 but simultaneously also imparts a torque or crank moment owing to the offset V.

The invention claimed is:

1. An exhaust-gas turbocharger, comprising:
a turbine housing having a turbine housing wall;
a wastegate valve disposed in said turbine housing, said wastegate valve being a ballcock-type valve having a spherical-segment-shaped closing element; and
an actuating crank having a crank arm to which said closing element is fastened, and a crank spindle integrally connected to said crank arm, said actuating crank mounted in said turbine housing wall so as to be rotatable about a crank spindle axis of rotation, said actuating crank further having an abutment shoulder disposed in a transition region between said crank spindle and said crank arm, said crank arm having a flexural-stress relief pocket formed therein, wherein adjoining said abutment shoulder on an inner side of said crank arm directed toward said turbine housing wall there is disposed said flexural-stress relief pocket for effecting a more uniform distribution of flexural stresses in said transition region between said crank arm and said crank spindle.

2. The exhaust-gas turbocharger according to claim 1, wherein said flexural-stress relief pocket extends in said crank arm in a radial direction toward the crank spindle axis of rotation as far as into a region of an outer diameter of said crank spindle, so as to undercut said abutment shoulder, and has a rounded contour at a pocket base formed there.

3. The exhaust-gas turbocharger according to claim 2, wherein said rounded contour on said pocket base has a radius of between 0.2 mm and 1.5 mm.

4. The exhaust-gas turbocharger according to claim 2, wherein said crank arm has reinforcement ribs and said flexural-stress relief pocket extends along said inner side of said crank arm and is delimited on both sides by in each case one of said reinforcement ribs.

5. The exhaust-gas turbocharger according to claim 1, wherein said reinforcement ribs have a height on said inner side of said crank arm selected such that said reinforcement ribs extend in a direction of the crank spindle axis of rotation at most as far as into a region of said abutment shoulder.

\* \* \* \* \*